(12) United States Patent
Hein et al.

(10) Patent No.: US 10,943,721 B2
(45) Date of Patent: Mar. 9, 2021

(54) MAGNET DEVICE COMPRISING STATORS AND TRANSLATORS

(71) Applicant: SEH LIMITED, Birkirkara (MT)

(72) Inventors: Jérémy Hein, Monaco (MC); Martin Marschner Von Helmreich, Monaco (MC)

(73) Assignee: SEH LIMITED, Birkirkara (MT)

(*) Notice: Subject to any disclaimer, the term of this patent is extended or adjusted under 35 U.S.C. 154(b) by 989 days.

(21) Appl. No.: 15/513,962

(22) PCT Filed: Sep. 18, 2015

(86) PCT No.: PCT/EP2015/071471
§ 371 (c)(1),
(2) Date: Mar. 23, 2017

(87) PCT Pub. No.: WO2016/046084
PCT Pub. Date: Mar. 31, 2016

(65) Prior Publication Data
US 2017/0278612 A1    Sep. 28, 2017

(30) Foreign Application Priority Data

Sep. 23, 2014  (AT) .................................. A 727/2014

(51) Int. Cl.
*H01F 7/14*      (2006.01)
*H01F 7/16*      (2006.01)
(Continued)

(52) U.S. Cl.
CPC ........... *H01F 7/1646* (2013.01); *H01F 7/081* (2013.01); *H01F 7/122* (2013.01); *H01F 7/14* (2013.01);
(Continued)

(58) Field of Classification Search
CPC .... H02K 41/03; H02K 41/033; H02K 41/031; H02K 33/16; H01F 7/1646; H01F 7/081; H01F 7/14; H01F 7/122
(Continued)

(56) References Cited

U.S. PATENT DOCUMENTS

2008/0169708 A1*  7/2008  Shibata ............... G03F 7/70758
                                                          310/12.06
2008/0211324 A1*  9/2008  Jack ....................... H02K 15/03
                                                          310/12.24

FOREIGN PATENT DOCUMENTS

WO     WO-2013034535 A2 *  3/2013  ............. H02K 33/16

* cited by examiner

*Primary Examiner* — Terrance L Kenerly
(74) *Attorney, Agent, or Firm* — FisherBroyles, LLP (57) ABSTRACT

A magnetic device comprising at least one stator (1) and one actuator (2), wherein the stator (1) and the actuator (2) respectively comprise at least one magnet with pole ends and a line of action of the magnet, and the actuator (2) can be moved linearly along a movement axis (3) and/or rotatably about a movement axis in a movement direction (4), wherein a stator line of action (15) of the stator (1) or a stator extension line (16) of the stator line of action (15), which stator extension line (16) extends as a geometric ray away from the pole end of the stator (1) as geometric tangent to the stator line of action (5), and an actuator line of action (25) of the translator (2) or an actuator extension line (26) of the translator line of action (25), which translator extension line (26) extends as a geometric ray away from the pole end of the translator (2) as geometric tangent to the translator line of action (25), respectively have intersection points (10), and the stator line of action (15), possibly the stator extension line (16), the translator line of action (25), and possibly the translator extension line (26) form a closed geometric shape so that the magnetic flux between the stator (1) and the (Continued)

Figure 5 translator (2) is bundled, wherein lines of action (5) and extension lines (6) extend through the magnetic device in an intersecting plane (11) comprising the movement axis (3).

8 Claims, 5 Drawing Sheets

(51) Int. Cl.
    *H02K 33/16*     (2006.01)
    *H02K 41/03*     (2006.01)
    *H01F 7/122*     (2006.01)
    *H01F 7/08*     (2006.01)
    *H01F 7/18*     (2006.01)

(52) U.S. Cl.
    CPC ........... *H01F 7/1844* (2013.01); *H02K 33/16* (2013.01); *H02K 41/031* (2013.01); *H01F 2007/086* (2013.01); *H01F 2007/1692* (2013.01); *H01F 2007/185* (2013.01); *H02K 2201/03* (2013.01)

(58) Field of Classification Search
    USPC ...................................................... 310/12.25
    See application file for complete search history.

MAGNET DEVICE COMPRISING STATORS AND TRANSLATORS

CLAIM FOR PRIORITY

This is a U.S. National Phase Entry of International Application No. PCT/EP2015/071471, filed Sep. 18, 2015, and claims priority from Austrian Patent Application A727/2014, filed Sep. 23, 2014, both of which are incorporated herein by reference.

BACKGROUND

This invention relates to a magnetic device comprising at least one stator and at least one actuator, wherein the stator and the actuator respectively comprise at least one magnet with pole ends and a line of action of the magnet, and the actuator can be move linearly along a movement axis and/or rotatably about a movement axis in a movement direction.

On the basis of the established teaching, in the magnetic device according to the invention, a relative movement between the stator and the actuator can create a force condition, which force condition can be transferred via the actuator to additional elements not mentioned within the scope of the disclosure of the invention. The force condition can bring about a linear or rotative relative movement between the unmovably mounted stator and the movably mounted actuator, so that the actuator can drive additional elements.

The magnetic device according to the invention can be used as drive or as generator.

A magnetic drive according to the prior art comprises at least one stator and one actuator, wherein the interaction of the magnets is determined by the magnetic flux between the surfaces of the magnets adjacent and allocated to one another. WO2013034339 teaches that an interaction between the magnets also takes place across all surfaces.

Building on the knowledge from WO2013034339, the person skilled in the art sets himself the task of bundling the magnetic fluxes that do not occur between the surfaces adjacent and allocated to one another, in order to increase the efficiency of the magnetic device in this way.

SUMMARY

According to the invention, this is achieved in that a stator line of action of the stator or a stator extension line of the stator line of action, which stator extension line extends as a geometric ray from the pole end of the stator and away from the stator as geometric tangent to the stator line of action, and a actuator line of action of the actuator or an actuator extension line of the actuator line of action, which actuator extension line extends as a geometric ray from the pole end of the actuator and away from the actuator as geometric tangent to the actuator line of action, respectively have intersection points, and the stator line of action, possibly the stator extension line, the actuator line of action, and possibly the actuator extension line form a closed geometric shape so that the magnetic flux between the stator and the actuator is bundled, wherein lines of action and extension lines extend through the magnetic device in an intersecting plane comprising the movement axis.

The closed geometric shape can be created by a stator line of action, possibly by a stator extension line, an actuator line of action, and possibly an actuator extension line when the stator and translator are connected to one another at a point by a joint in a manner so as to move with one another.

In practice, the closed geometric shape is formed by stator lines of action, possibly by stator extension lines, translator lines of action, and possibly translator extension lines.

The solution above includes the possibility of the closed geometric shape being formed by the stator extension line, for example. Consideration is thereby given to the case that the stator line of action and the translator extension line have an intersection point, such that the closed geometric shape is formed only by the stator line of action, the translation extension line, and the translator line of action.

Analogously thereto, the translator extension line cannot be part of the closed geometric shape.

According to the established teaching, a line of action of a magnet extends between the pole ends in this magnet.

The intersecting plane comprising the movement axis extends through the magnetic device.

The magnetic device according to the invention can extend in a plane. A magnetic device extending in a plane can, for example, be a two-dimensional magnetic device. The intersecting plane through the magnetic device extends in this first case in the plane of the magnetic device according to the invention.

The magnetic device according to the invention can also be a three-dimensional body. The intersecting plane in this second case intersects the magnetic device in the movement axis and has an arbitrary orientation with respect to the movement axis. The movement axis can form an axis of symmetry of the magnetic device.

A magnet can have a polygonal shape, at the end of which the poles of the magnet are formed. The line of action extends between the poles, wherein the direction of the line of action at the pole is defined by the tangent. The geometric extension line is defined within the scope of this invention as a ray parallel to the tangent, which ray extends away from the magnet.

In the magnetic device according to the invention, the lines of action are formed such that the lines of action and the extension lines form a closed shape.

In the case of a magnetic device with a linearly or rotatably movable translator, the sum of the torques, which are formed by the interaction forces F and the distance of these forces from the movement axis, can be zero.

The translator can have a linear or polygonal movement axis. The sum of the torques, which are formed by the interaction forces F and the distance of these forces from the movement axis, can be zero.

The disclosure of the invention above does not exclude, specific to the application, the possibility of the sum of the torques not being equal to zero.

In addition to the measures described above for bundling the magnetic flux, the magnetic device according to the invention can comprise magnet shielding elements, which are arranged adjacently to the gap resulting between the magnets.

Magnet shielding elements are known from the prior art. Magnet shielding elements can, for example, be made of a ferromagnetic material.

The movement axis can be the axis of symmetry of the magnetic device, for portions of the magnetic device. In a two-dimensional magnetic device, the movement axis can be the axis of symmetry; in a three-dimensional magnetic device, it can be the axis of rotation.

In the figures, the following reference symbols denote the following elements:
r Stator/translator distance
F Interaction force
+/− Polarity
1 Stator
2 Translator
3 Movement axis
4 Movement direction
15 Stator line of action
25 Translator line of action
16 Geometric stator extension line
26 Geometric translator extension line
7 Magnet shielding element
8 Gap
9 Magnets
10 Intersection point
11 Winding
12 Intersecting plane
13 Centers
17 Inner stator pole end
18 Outer stator pole end
19 Inner translator pole end
20 Outer translator pole end The figures are exclusively used to clarify the invention disclosed here. The figures are in no case to be interpreted as restricting the object of the invention.

DESCRIPTION

Figure 1:
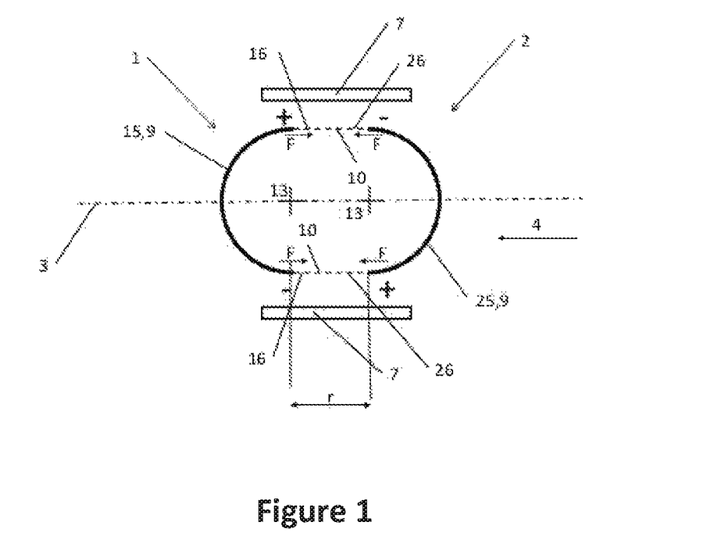
FIG. 1 shows a possible first embodiment of a two-dimensional magnetic device according to the invention, comprising one stator and one translator.

FIG. 1 shows a possible first embodiment of a magnetic device according to the invention. The magnetic device comprises a flatly designed stator 1 and a flatly designed translator 2, wherein the stator 1 and the translator 2 respectively comprise a magnet 9 with pole ends and a line of action of the magnet. FIG. 1 thus shows a two-dimensional magnetic device, wherein the intersecting plane 12 lies in the viewing plane of FIG. 1.

No movement of the translator 2 toward the stator 1 is marked in FIG. 1, since the movement of the translator 2 toward the stator 1 does not have any influence on the object of the invention, viz., the design of bundled magnetic fluxes between the magnets 9. The movement of the translator 2 can take place linearly in parallel to the movement axis and/or rotatably about the movement axis 3.

The polarity +/− of the magnets 9 is marked in FIG. 1, which polarity is to be selected according to the established teaching, so that a movement of the translator 2 relative to the stator 1 can be brought about by the interaction forces F. In order to be able to execute a movement of the translator 1 in the movement direction 4 marked in FIG. 1 and in a movement direction opposite thereto (not shown in FIG. 1), the person skilled in the art designs the magnets 9 as electromagnets. The polarity of electromagnets can be switched.

The magnets 9 have a polygonal segment shape in the embodiment shown in FIG. 1. The magnets 9 substantially have the shape of arc segments. The centers 13 of the arc segments are arranged adjacently to one another. The centers 13 of the arc segments are on the movement axis 3, which movement axis 3 also forms the axis of symmetry of the magnetic device.

With reference to the established teaching, the line of action of the magnets 9 have the shape of an arc segment. The stator line of action 15 and the translator line of action 25 thus have the shape of an arc segment. In FIG. 1, the arc segment shape of the magnets 9 and the circular segment shape of the lines of action are shown by congruent lines.

The geometric extension lines are geometric rays, which extend from the pole end of the magnet 9 as extension lines of the magnetic lines of action. The stator extension lines 16 of the stator lines of action 15 are geometric rays, which extend away from the pole end of the stator 1 as geometric tangents toward the stator line of action 15. The translator extension lines 26 of the translator lines of action 25 are also geometric rays, which extend from the pole ends of the translator 2 as geometric tangents to the stator line of action 15.

The geometric stator extensions 16 and translator extensions 26 intersect at an intersection line comprising intersection points 10. In the embodiment shown in FIG. 1, the geometric stator extensions 16 and translator extensions 26 are parallel and congruent, which is why the embodiment shown in FIG. 1 has one intersection line comprising one intersection point 10.

In accordance with the teaching of geometry, the geometric stator extension 16 is oriented in the same manner as the stator line of action 15 in the end region of the magnet. The same is to be noted for the translator line of action 25 and the translator extension line 26.

The lines of action 15, 25 and the geometric extensions 16, 26 form a closed geometric shape independently of the distance r of the translator to the stator. The magnetic flux between the magnets 9 of the stator 1 and the magnets 9 of the translator 2 are thus bundled.

The sum of the torques, which are formed by the interaction forces F and the distance of these forces from the movement axis 3, is zero. The movement axis 3 is not subject to a torsional load as a result of the interaction forces F, the lines of action of which are spaced apart from the movement axis 3.

In order to increase the effect of the bundling of the magnetic current between the magnets 9, magnet shielding elements 7 are arranged adjacently to the gap 8 resulting between the magnets.

Figure 2:
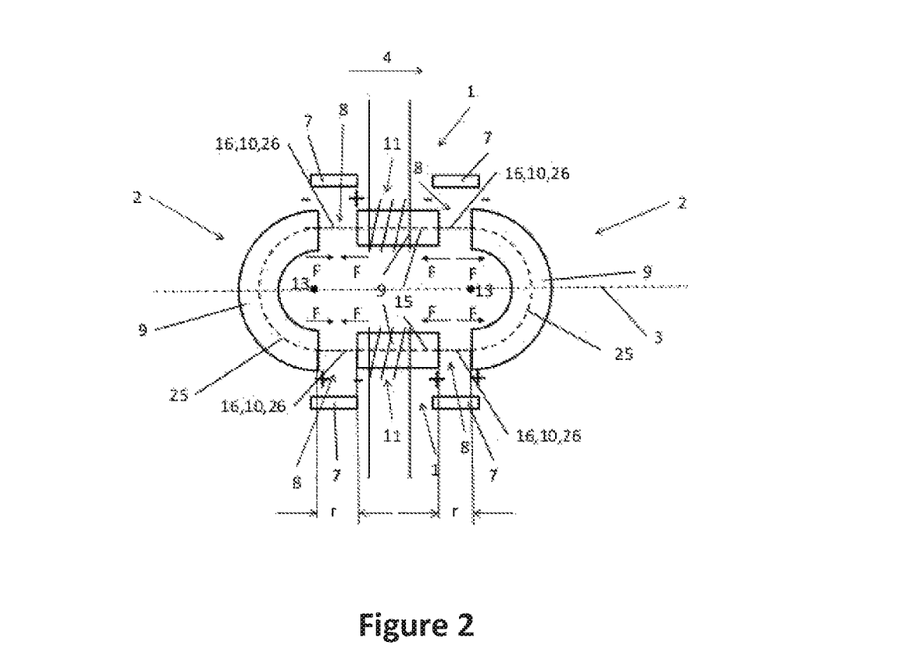
FIG. 2 shows a possible second embodiment of a two-dimensional magnetic device according to the invention, which magnetic device comprises one stator and two translators.

FIG. 2 shows a possible second embodiment of a two-dimensional magnetic device according to the invention. The magnetic device comprises a stator 1 and two translators 2. The translators 2 can be moved along the movement axis 3 in the movement direction 4. The intersecting plane 12 comprising the movement axis 3 thus extends in the viewing plane of FIG. 2. The intersecting plane 12 thus extends through the magnetic device.

Building on the principle shown in FIG. 2, the person skilled in the art can derive a magnetic device with n stators 1 and n+1 translators 2, but also n translators 1 and n+1 stators 2.

The lines of action 15, 25 and the geometric extension lines 16, 26 oriented in the same direction thereto form a closed geometric shape. The extension lines 16, 26 intersect one another at an intersection line comprising an intersection point 10; in the embodiment shown in FIG. 2, the extension lines 16, 26 intersecting one another are, again, congruent and parallel.

The magnets 9 of the stator 1 are designed as flat rectangles. The magnets 9 of the stator are electromagnets. FIG. 2 shows a schematic representation of the winding 11. The stator line of action 15 extends linearly in the region of the stator 1, in accordance with the established teaching. The stator extension lines 16 again extend away from the pole ends of the stator 1 as geometric rays, which also form a tangent to the stator line of action 15.

The magnets 9 of the translators 2 are designed as flat arc segments, wherein the centers 13 of the arc segments are arranged adjacently to the stators, so that the arc segments form surfaces concave to one another. The centers 13 are located on the movement axis 3. The magnets 9 of the translators 2 are designed as permanent magnets.

The translator lines of action 25 are marked as arcs in FIG. 2, in accordance with the established teaching. The translator extension lines 26 extend as geometric rays, which form a tangent to the respective translator line of action 25 at a pole end of the translator 2.

The stator extension lines 16 and the translator extension lines 26 are arranged congruently and in parallel in the gap 8 between the stator 1 and the translator 2.

As a result of this arrangement, the magnetic fluxes between the magnets 9 of the stator 1 and the translators 2 are bundled.

In order to increase the bundling, shielding elements 7 are arranged adjacently to the gap 8.

A shifting of the magnets 9 of the stators outward, so that the adjacent lines of action 15, 25 and/or the extensions 16, 26 do not have any intersection point 10, would constitute a worse embodiment of the magnetic device according to the invention.

Figure 3:
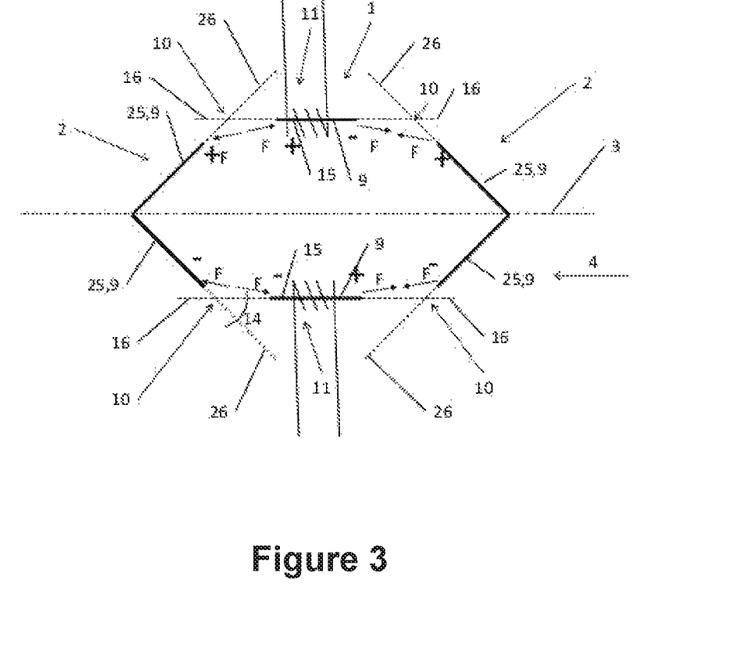
FIG. 3 shows a possible third embodiment of a two-dimensional magnetic device according to the invention, which magnetic device comprises two translators and one stator.

FIG. 3 shows a possible third embodiment of a two-dimensional magnetic device according to the invention, which magnetic device is similar to the embodiment shown in FIG. 2. The magnetic device again comprises a stator 1 and two translators 2. The stator 1 and the translators 2 are designed to be flat, which is why the embodiment shown in FIG. 3 is a two-dimensional magnetic device. The intersecting plane 12, extending through the magnetic device and also comprising the movement axis 3, extends in the image plane of FIG. 3.

In contrast to the second embodiment, the translators 2 have a polygonal shape in this case. The effect of the third embodiment is less than that of the second embodiment, since the interaction forces F in the third embodiment are at an angle to the movement direction 4.

The stator 1 is designed as a rectangular magnet 9. In accordance with the established teaching, the stator line of action 15 and the stator extension line 16 run in parallel.

The translator line of action 25 is marked in FIG. 3 as congruent to the translator 2. The translator extension line 26 is oriented in parallel to the translator line of action 25 as a result of the linear shape of the translator line of action 25 at the pole end of the translator 2.

The extensions 16, 26 intersect one another at the intersection point 10, so that the extensions 16, 26 and the lines of action 15, 25 result in a closed shape. The extensions 16, 26 intersecting at the intersection point 10 are at an acute angle 14 to one another, which acute angle 14 is marked once, by way of example, in FIG. 3 for the sake of clarity. This closed shape again brings about the bundling of the magnetic fluxes. The translators 2 are designed as permanent magnets. The stators 1 are designed as electromagnets, wherein the winding is shown schematically in FIG. 3.

Figure 4:
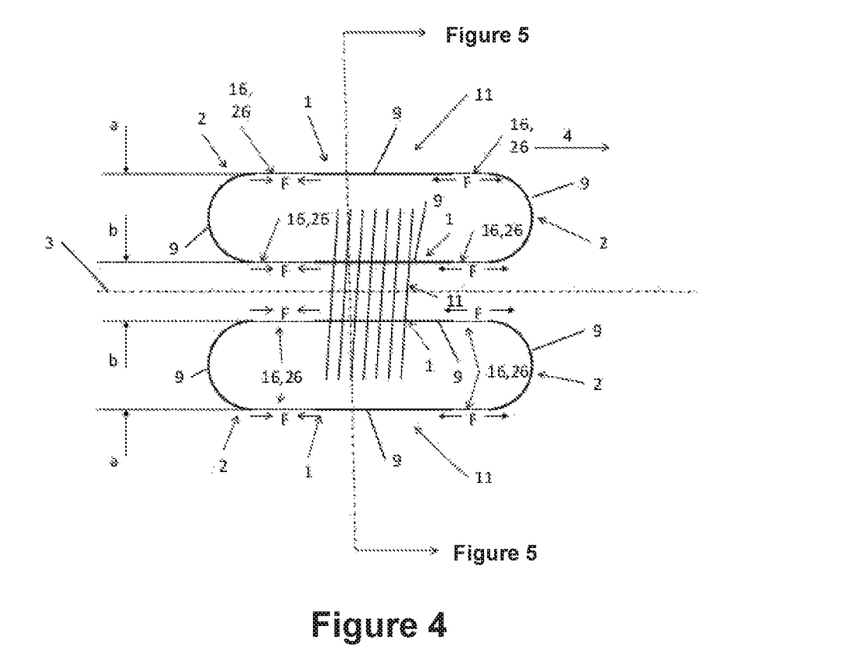
FIG. 4 and FIG. 5 show a possible embodiment of a three-dimensional magnetic device according to the invention, which magnetic device comprises two translators and one stator.
Figure 5:
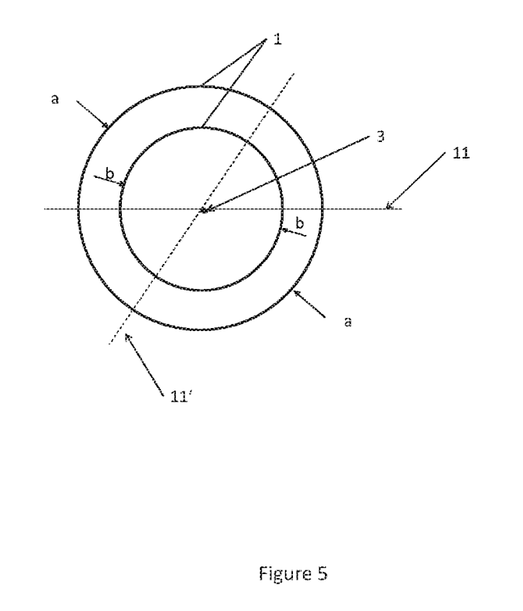

FIG. 4 shows a plan view of a three-dimensional magnetic device; FIG. 5 shows the associated sectional view.

The magnetic device comprises a stator 1 and two translators 2 arranged laterally to the stator 1. As shown clearly in FIG. 5, the stator 1 comprises two bodies of rotation in the shape of hollow cylinders with different diameters, the axis of rotation of which coincides with the movement axis 3. The translators 2 are designed as a torus, the axis of rotation of which also coincides with the movement axis 3. The translators are mounted so as to be movable along the movement axis 3 in the movement direction 4.

The translators 2 are designed as permanent magnets; the stator 1 is designed as an electromagnet. The winding of the stator 1 designed as an electromagnet is marked schematically in FIG. 4; for the sake of clarity, this winding 11 is not marked in FIG. 5. The winding 11 extends substantially between the bodies of rotation of the stator 1. With reference to the established teaching, a movement of the translators 2 relative to the stator 1 can be brought about by switching the stator 1. The polarity of the magnets 9 is not marked in FIG. 4, for the sake of clarity; the person skilled in the art selects the polarity in accordance with the established teaching or on the basis of FIGS. 1 to 3.

The lines of action 15, 25 and the extension lines 16, 26 of the magnets 9 designed as stator 1 and as translator 2, which lines of action 15, 25 extend through the magnetic device in an intersecting plane 11 comprising the movement axis 3, form a closed geometric shape. The intersection points (reference symbol 10) are not marked in FIG. 4, for the sake of clarity. The magnetic flux between the magnets is bundled by this arrangement and design of the magnets.

The forces F generated by the magnets 9 bring about a movement of the translators 2 along the movement axis 3. The sum of the torques generated by the forces F and the distance of the respective force F to the movement axis is zero.

FIG. 5 shows an intersecting plane 12, which is also marked in FIG. 4. The magnetic device according to the invention is characterized in that additional intersecting planes 11' can be formed by the three-dimensional magnetic device, wherein the lines of action 15, 25 and their extension lines 6 form a closed shape in any intersecting plane 11, 11'.

The outer diameter a and the inner diameter b of the magnets 9 are marked in FIG. 4 and FIG. 5.

Figure 6:
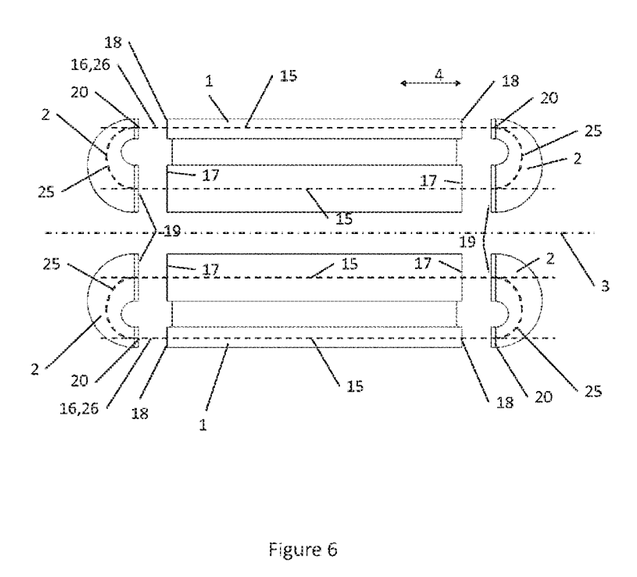
FIG. 6 and FIG. 7 show another possible embodiment of a three-dimensional magnetic device according to the invention.
Figure 7:
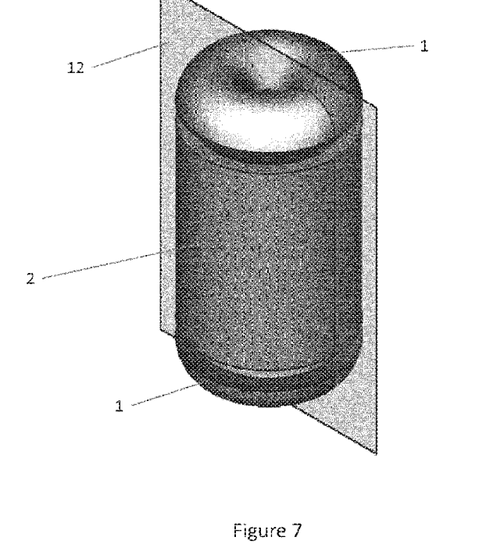

Similarly to FIG. 4, FIG. 6 shows a sectional view through a three-dimensional embodiment of the magnetic device according to the invention. The magnetic device comprising a stator 1 and an actuator 2 arranged laterally to the stator 1 is shown in FIG. 7. The stator 1 has the shape of a cylinder; the actuators 2 have the shape of a toroid. The respective axis of symmetry of the cylinder and the toroids are congruent with the movement axis.

The stator 1 is designed as an electromagnet, and the actuator 2 is designed as a permanent magnet.

In the sectional view of FIG. 6, the actuators 2 are sickle-shaped. The stator 1 is arranged between the laterally arranged actuators 2 and is moved along the movement axis 3 in the movement direction 4.

The actuator line of action 25 extends in an arc within the sickle-shaped cross section of actuator 2, and thus similarly to the sickle-like shape of the actuator 2, in accordance with the established teaching, from a center of the pole end of the sickle-shaped actuator 2 to the center of the other pole end of the sickle-shaped actuator 2. The stator line of action 15 also extends, in accordance with the established teaching, from a center of the pole end of the stator 1 to the other pole end of the stator 1. Since the stator 1 extends linearly in the sectional view, the stator line of action 15 also extends linearly. The stator extension line 16 and the actuator extension line 26 extend congruently, so that these extension lines intersect one another.

The surface of the inner stator pole ends 17 and the surface of the outer stator pole ends 18 are of equal size. To that end, due to their smaller diameter, the inner stator pole ends 17 have a greater width than the outer stator pole ends 18. Analogously thereto, the surface of the inner actuator pole ends 19 and the surface of the outer actuator pole ends 20 are of equal size. Due to the larger diameter of the outer actuator pole ends 19, the width of the outer actuator pole ends 20 is less than the width of the inner actuator pole ends. These proportions of the surfaces and the widths have the effect that a moment of force about the movement axis 3 is prevented.

Figure 8:
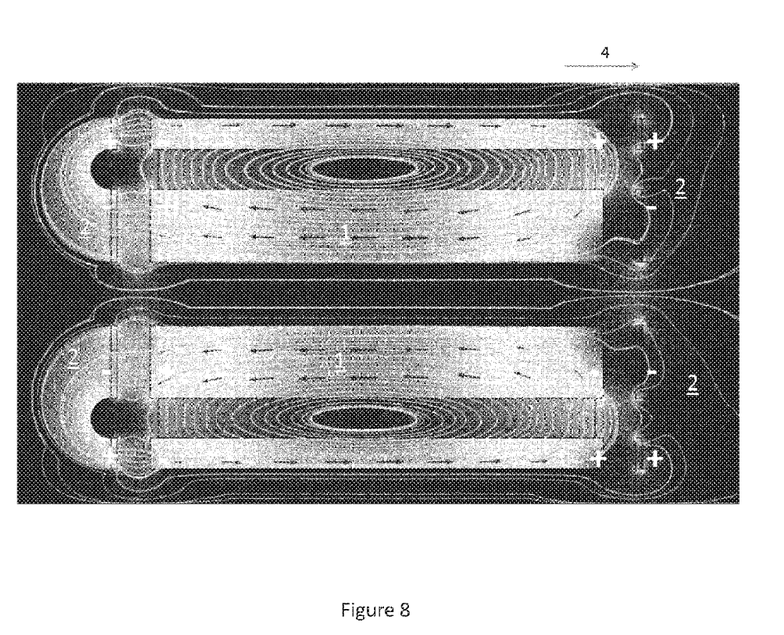
FIG. 8 and FIG. 9 show FEM simulations for FIG. 6.
Figure 9:
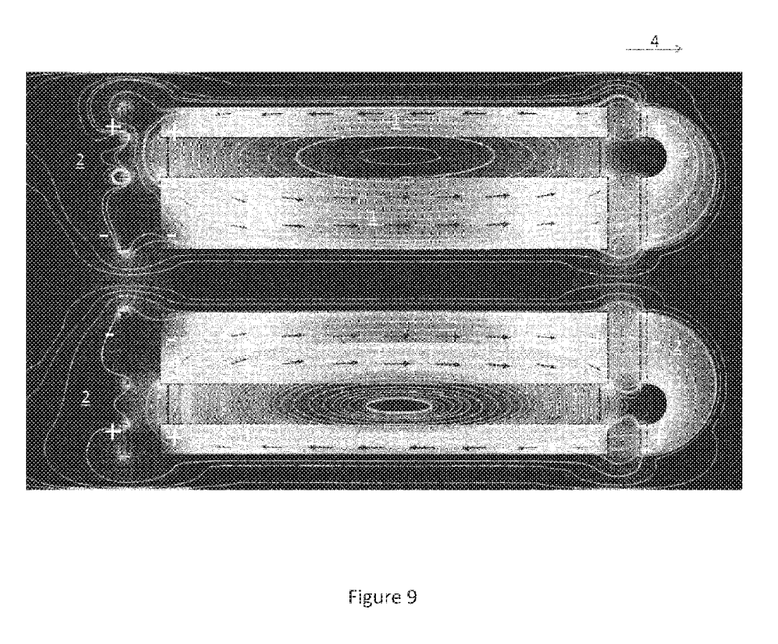

FIG. 8 and FIG. 9 show an FEM simulation of the magnetic device shown in FIG. 6 and FIG. 7. The closing magnetic field lines can be seen clearly.

The invention claimed is:

1. A magnetic device comprising:
   at least one stator; and
   at least two actuators,
      wherein each actuator has at least one first inner actuator pole end and one second outer actuator pole end,
      wherein each stator has at least two first inner stator pole ends and two second outer stator pole ends,
      wherein the first inner stator pole ends are arranged opposite to the first inner actuator pole ends of said actuators and the second outer stator pole ends of said stator are arranged opposite to the second outer actuator pole ends of said actuators,
      wherein the actuators are movably supported with respect to the stator so that said actuators are linearly movable in parallel to a movement axis along a movement direction,
      wherein the stator comprises two magnets which are formed by two concentric hollow cylinders oriented along the movement axis, and
      wherein each actuator is arcuate between its pole ends in such a way that the magnetic flux is bundled from the first inner actuator pole end to the second outer actuator pole end or from the second outer actuator pole end to the first inner actuator pole end.

2. The magnetic device according to claim 1, wherein each stator is constructed as an electromagnet, while each actuator is constructed as a permanent magnet.

3. The magnetic device according to claim 1, wherein a winding extends between the concentric hollow cylinders.

4. The magnetic device according to claim 1, wherein the surface of the inner actuator pole end and the surface of the outer actuator pole end are equal in size.

5. The magnetic device according to claim 1, wherein the diameters of the two hollow cylinders are selected so that the surfaces of the inner stator pole end and the outer stator pole end of said stator are equal in size.

6. The magnetic device according to claim 1, wherein the surfaces of the pole ends of said stator and the surfaces of the pole ends of said actuators are equal in size.

7. The magnetic device according to claim 1, wherein the actuator has a sickle shape within any cross-section view containing the movement axis.

8. The magnetic device according to claim 1, wherein the movement axis is an axis of symmetry of the magnetic device.

* * * * *